(12) United States Patent
Kim et al.

(10) Patent No.: US 11,506,785 B2
(45) Date of Patent: Nov. 22, 2022

(54) ASYMMETRIC OPTICAL SENSOR DEVICE

(71) Applicant: LG ELECTRONICS INC., Seoul (KR)

(72) Inventors: Bolam Kim, Seoul (KR); Seonghong Park, Seoul (KR); Sangkeun Lee, Seoul (KR); Pilwon Jeong, Seoul (KR); Yongho Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 734 days.

(21) Appl. No.: 16/322,250

(22) PCT Filed: Aug. 23, 2016

(86) PCT No.: PCT/KR2016/009299
§ 371 (c)(1),
(2) Date: Jan. 31, 2019

(87) PCT Pub. No.: WO2018/026046
PCT Pub. Date: Feb. 8, 2018

(65) Prior Publication Data
US 2019/0196016 A1    Jun. 27, 2019

(30) Foreign Application Priority Data

Aug. 1, 2016  (KR) .................. 10-2016-0098209

(51) Int. Cl.
| | | |
|---|---|---|
| *G01S 17/04* | (2020.01) |
| *G02B 3/00* | (2006.01) |
| *G01J 1/08* | (2006.01) |
| *G01J 1/04* | (2006.01) |
| *G01S 17/931* | (2020.01) |
| *G01S 7/481* | (2006.01) |

(Continued)

(52) U.S. Cl.
CPC ................. *G01S 17/04* (2020.01); *G01J 1/04* (2013.01); *G01J 1/08* (2013.01); *G01S 7/4814* (2013.01); *G01S 17/931* (2020.01); *G02B 3/005* (2013.01); *G02B 7/021* (2013.01); *G02B 27/30* (2013.01)

(58) Field of Classification Search
None
See application file for complete search history.

(56) References Cited

U.S. PATENT DOCUMENTS

2014/0240691 A1 *  8/2014  Mheen .................. G01S 7/4818
356/4.07

FOREIGN PATENT DOCUMENTS

| JP | 2014-202610 A | 10/2014 |
| KR | 10-2011-0011244 A | 2/2011 |
| KR | 10-2013-0102400 A | 9/2013 |

(Continued)

*Primary Examiner* — Hovhannes Baghdasaryan
(74) *Attorney, Agent, or Firm* — Birch, Stewart, Kolasch & Birch, LLP

(57) ABSTRACT

The present invention provides an asymmetric optical sensor device comprising: a light emitting unit for outputting light; a light receiving unit which receives the light reflected by an external object, and consists of a plurality of pixels which correspond to regions of different angles with respect to the light emitting unit and are arranged in a row; and a lens unit for diffusing the light from the light emitting unit. The light amounts received by the plurality of pixels are light amount values which are asymmetric with respect to the center of the light receiving unit.

18 Claims, 4 Drawing Sheets

(51) Int. Cl.
 *G02B 7/02* (2021.01)
 *G02B 27/30* (2006.01)

(56) References Cited

FOREIGN PATENT DOCUMENTS

KR  10-2014-0028536 A  3/2014
KR  10-2015-0065473 A  6/2015

* cited by examiner

ASYMMETRIC OPTICAL SENSOR DEVICE

CROSS-REFERENCE TO RELATED APPLICATIONS

This application is the National Stage filing under 35 U.S.C. 371 of International Application No. PCT/KR2016/009299, filed on Aug. 23, 2016, which claims the benefit of earlier filing date and right of priority to Korean Application No. 10-2016-0098209, filed on Aug. 1, 2016 in the Republic of Korea, the contents of all of these applications are all hereby incorporated by reference herein in their entirety.

TECHNICAL FIELD

The present invention relates to an optical Time of Flight (TOF) sensor.

BACKGROUND ART

Optical Time of Flight (TOF) sensors may be classified into two types. A first type is a scanning type in which a scanning or sensing range of a wide angle of view is realized by mechanical scanning. The sensor of this type mostly has high-performance with a medium-range and wide angle of view, and high resolution, but causes many restrictions on price and mounting position. In addition, a mechanical motor section for scanning should be equipped, and thus reliability thereof is also problematic.

A sensor device capable of detecting an entire 360-degree area must be located on a roof of a car in order to perform its functions. In this case, a shaded area which is not scanned is generated, and a specific area beside the car cannot be scanned or detected.

A second type is a flash LiDAR, which differs from the scanning type, and is a type of spreading beams widely and performing scanning through an array sensor and the like. The flash type has a great merit in price because it is not equipped with a mechanical motor section and its light source structure is relatively simple.

However, the flash type has restrictions on an angle of view and a scannable distance, and is often applied to products of low cost with low resolution. Most flash types use a symmetric optical system, and thus beam is symmetrical with respect to an optical axis. Therefore, if asymmetric beam is required, efficiency of the optical system may be greatly lowered.

LiDARs of the two types according to the related art are restricted from being simultaneously applied to various functions due to limitations on sizes and functions.

DETAILED DESCRIPTION OF THE DISCLOSURE

Accordingly, the present invention provides an asymmetric optical structure capable of forming asymmetric transmission divergent beams to realize a multifunctional sensor.

To achieve the above aspect and other advantages of the present invention, there is provided an asymmetric optical sensor device, including a light emitting unit to output light, a light receiving unit to receive the light reflected by an external object, the light receiving unit provided with a plurality of pixels arranged in a row to correspond to regions of different angles with respect to the light emitting unit, and a lens unit to diffuse the light of the light emitting unit, wherein amounts of light received by the plurality of pixels are light amount values that are asymmetric with respect to a center of the light receiving unit.

In one embodiment of the present invention, since an axis of an optical lens unit is shifted with respect to an optical output axis of the light emitting unit, an asymmetric light source distribution can be formed with respect to the optical output axis, which may result in providing a different amount of light depending on an object located at a different distance.

In one embodiment of the present invention, a plurality of light sources can output light sequentially to different regions or a light receiving unit including a plurality of pixels can receive light reflected from different regions, thereby detecting different regions in a distinguishing manner. Accordingly, images according to different functions can be provided.

In one embodiment of the present invention, a light receiving unit may be provided with a plurality of pixels arranged in a row, and a center of the light receiving unit can be disposed to be shifted from an optical output axis, thereby allowing light to be asymmetrically distributed with respect to the center.

EFFECTS OF THE DISCLOSURE

According to the present invention, a wide area can be detected by forming a wide angle of view, and objects located at different distances can be detected by using a single light source unit even without an additional configuration or optical device.

Also, a different amount of light can be obtained depending on a distance and angle, which may allow the use of a single asymmetric optical sensor device even when different regions are detected according to different functions. In addition, since no additional configuration or optical device is required, such device can be made compact.

BEST MODE FOR CARRYING OUT PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Figure 1A:
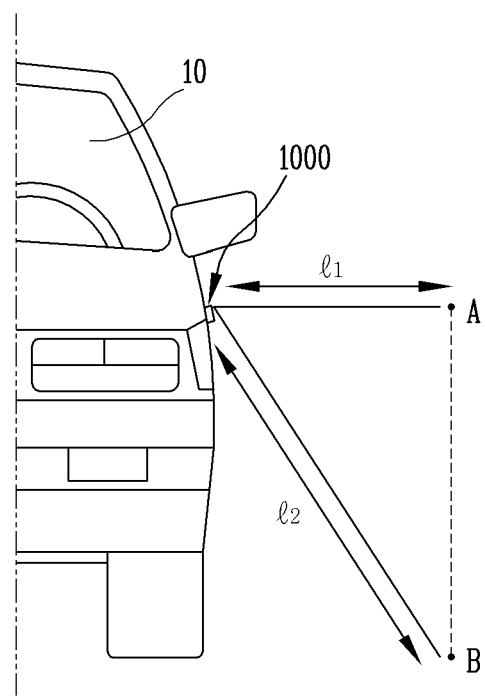
FIG. 1A is a conceptual view illustrating an example to which an asymmetric optical sensor device according to the present invention is applied.
Figure 1B:
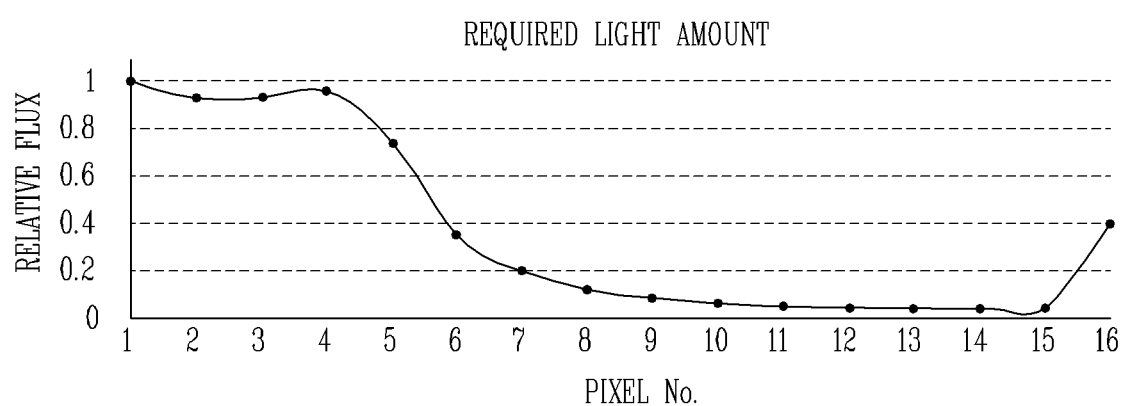
FIG. 1B is a graph for explaining light distribution of a transmitting unit of a multifunctional asymmetric optical sensor device.

FIG. 1 is a conceptual view illustrating an example to which an asymmetric optical sensor device according to the present invention is applied, and FIG. 1B is a graph for explaining Light distribution of a transmitting unit of a multifunctional asymmetric optical sensor device.

Referring to FIG. 1A, an asymmetric optical sensor device 1000 according to one embodiment of the present invention may be mounted in a vehicle 10. The asymmetric optical sensor device 1000 may have a detectable range from a first object A spaced apart by a first distance 11 to a second object B spaced apart by a second distance 12. Objects located between the first object A and the second object B may be detectable, and this is decided by an angle of view of the optical sensor device 1000.

For example, detection regions or areas for confirming a parking area or confirming a blind spot (Blind Spot Detection (BSD)) during travel of a vehicle are set differently. Accordingly, the optical sensor device 1000 may be controlled to detect objects disposed at different angles and distances.

Referring to FIG. 1B, an amount of light to be transmitted to each pixel of a light receiving unit differs. For example, first to fourth pixels require a large amount of light, an amount of light required by fifth to eighth pixels is gradually reduced, and ninth to fifteenth pixels require a relatively less amount of light.

When a plurality of pixels constituting the light receiving unit are arranged in one direction, the amount of light is asymmetric with respect to a center pixel area. It is preferable that a larger amount of light is detected in a region farther away from a light source unit (i.e., the asymmetric optical sensor device).

Although not shown in the drawings, the asymmetric optical sensor device 1000 may detect objects existing within a measurement range of about 7 m high, about 90° horizontally, and about 10° vertically.

According to the present invention, an amount of light corresponding to a pixel at the farthest end of the light receiving unit is relatively increasing. Therefore, an amount of light reaching a pixel located at an end can increase even by using the same light source, which may result in efficiently using the light source.

Figure 2A:
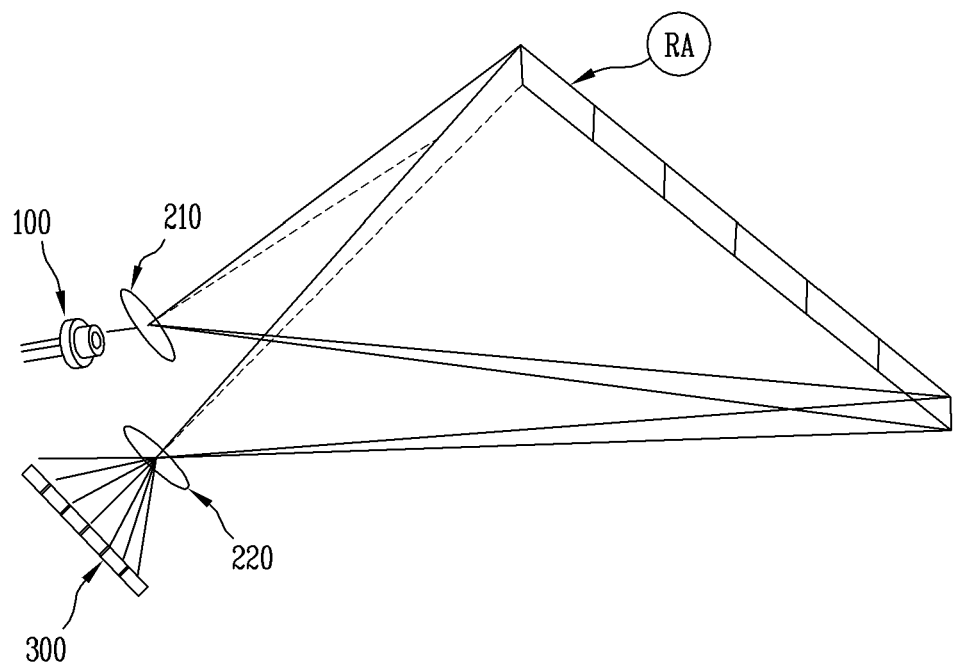
FIGS. 2A and 2B are conceptual views illustrating a structure of an asymmetric optical sensor device in accordance with one embodiment of the present invention.
Figure 2B:
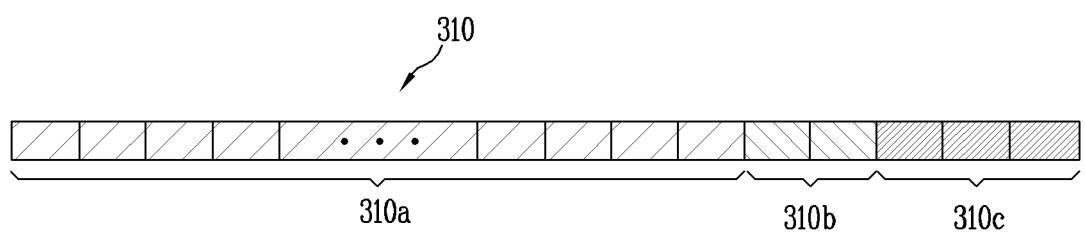

FIGS. 2A and 2B are conceptual views illustrating a structure of an asymmetric optical sensor device in accordance with one embodiment of the present invention.

Hereinafter, a method in which an area is divided by one optical sensor device will be described with reference to FIGS. 2A and 2B. The optical sensor device according to this embodiment includes a light emitting unit 100, a light emitting lens unit 210, a light receiving unit 300, and a light receiving lens unit 220.

The light emitting unit 100 may include one light source. The light source may be a laser. The light emitting unit 100 outputs light to all regions of a reception area RA at a time without sequential operations. Different amounts of light reach the reception area RA. Light is reflected by objects positioned in the reception area RA and reaches the light receiving lens unit 220.

The reflected light which has reached the light receiving lens unit 220 then reaches the light receiving unit 300 including the plurality of pixels. Each pixel corresponds to each region of the reception area RA to which the light has reached.

For example, a first group 310a of a plurality of pixels may detect an object located in a blind spot detection (BSD) area (a wide area), a second group 310b may detect an object located in a specific region, such as a parking area (a narrow area), and a third group 310c may check external light.

The light emitting unit 100 according to this embodiment should output light in the form of a line having a large difference in horizontal and vertical aspect ratios.

Figure 3A:
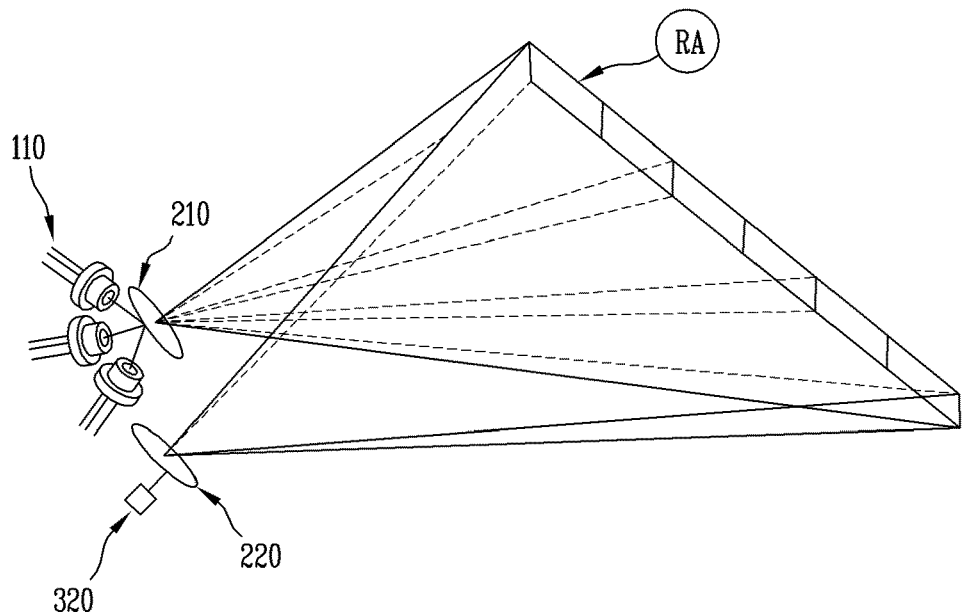
FIGS. 3A and 3B are conceptual views illustrating a structure of an asymmetric optical sensor device in accordance with another embodiment of the present invention.
Figure 3B:
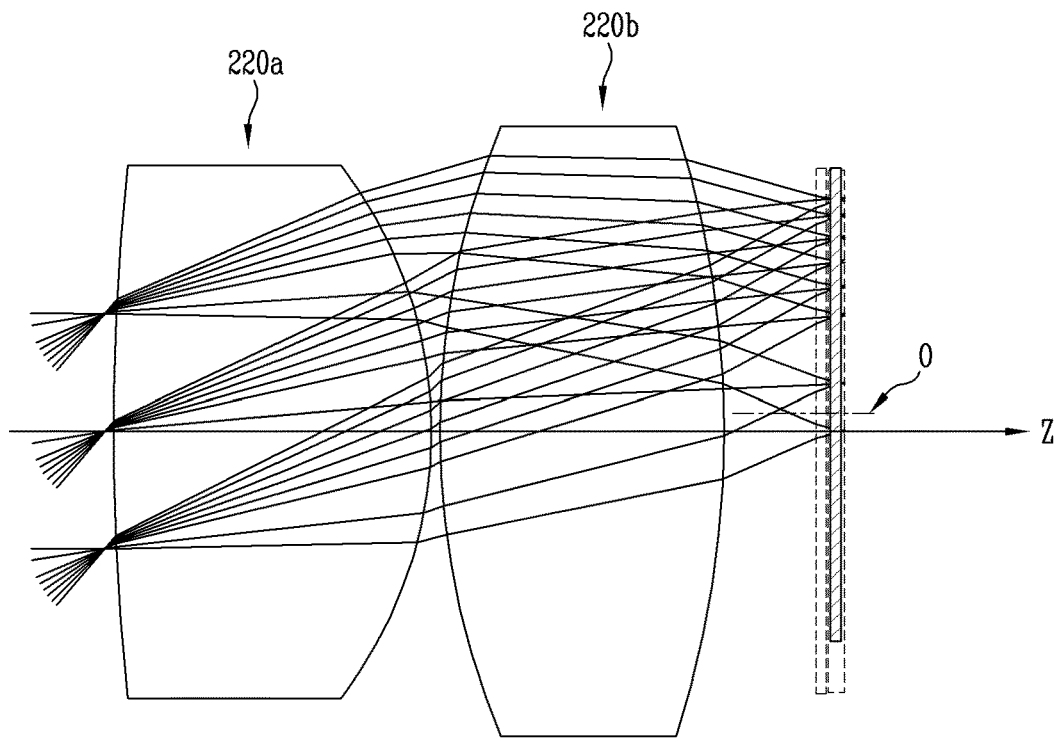

FIGS. 3A and 3B are conceptual views illustrating a structure of an asymmetric optical sensor device in accordance with another embodiment of the present invention.

Referring to FIGS. 3A and 3B, the light emitting unit 110 includes a plurality of light sources. Light output from the light sources reaches the reception area RA through the light emitting lens unit 210. Light reflected by an object located in the reception area RA reaches the light receiving unit 320 through the light receiving lens unit 220.

First, the plurality of light sources sequentially outputs light, rather than emitting light at a time, and outputs light to only one region of the reception area RA. One region to which light is output corresponds to the plurality of light sources. That is, when all the light sources emit light, the light reaches the entire reception area RA.

In this case, the respective light sources may output different amounts of light depending on a distance and an angle of the reception area RA to which such light is to reach.

The light output from each light source is reflected by an object and sequentially reaches the light receiving unit 320. The light receiving unit 320 according to this embodiment is not provided with a plurality of pixels. One image may be generated by combining all the light which have reached with time differences. That is, the asymmetric optical sensor device corresponds the light received with the time differences to the respective regions of the reception area RA. Therefore, states of all the regions can be identified or checked.

On the other hand, the plurality of light sources may be selectively activated based on a specific function to be executed. For example, when only a function for detecting a blind spot is executed while a vehicle is driven, only light for detecting an object at a specific distance, located close to an optical output axis, is output. Therefore, only some light sources are activated so as to output light to only one region corresponding to the close distance.

FIG. 3B illustrates an arrangement structure of the light receiving lens unit 220 and the light receiving unit 320, specifically, a detection unit. The light receiving lens unit 220 includes first and second lenses 220a and 220b which overlap each other. Light passing through the first lens 220a is diffused and then collected again while passing through the second lens 220b.

An optical output axis Z of the light receiving lens unit 220 is arranged to be shifted from a center O of the light receiving lens unit 200. That is, since the light receiving unit 320 is shifted with respect to the light receiving lens unit 220 so that the center of the light receiving lens unit 220 does not overlap the optical output axis Z.

The optical output axis Z of the light receiving lens unit 220 is shifted to one region of the light receiving unit. Of first and second pixels which are both end pixels of the light receiving lens unit 220, an amount of light of the second pixel located close to the optical output axis Z of the light receiving lens unit 220 is larger than that of the first pixel. As a result, the amounts of light received are asymmetric, and thus different amounts of light can be provided depending on distances.

Figure 4A:
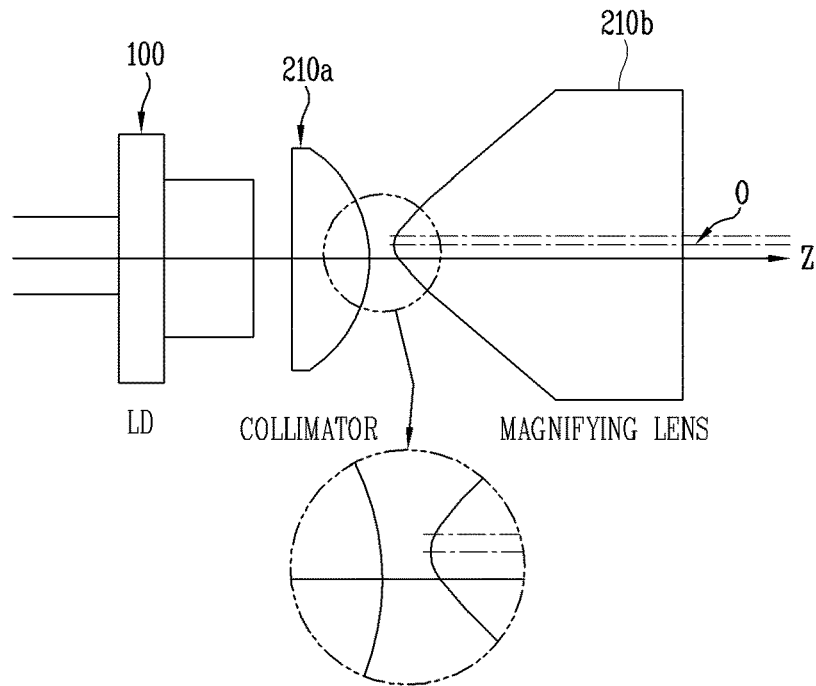
FIGS. 4A and 4B are conceptual views illustrating structural variations of a light emitting lens and a light emitting unit.
Figure 4B:
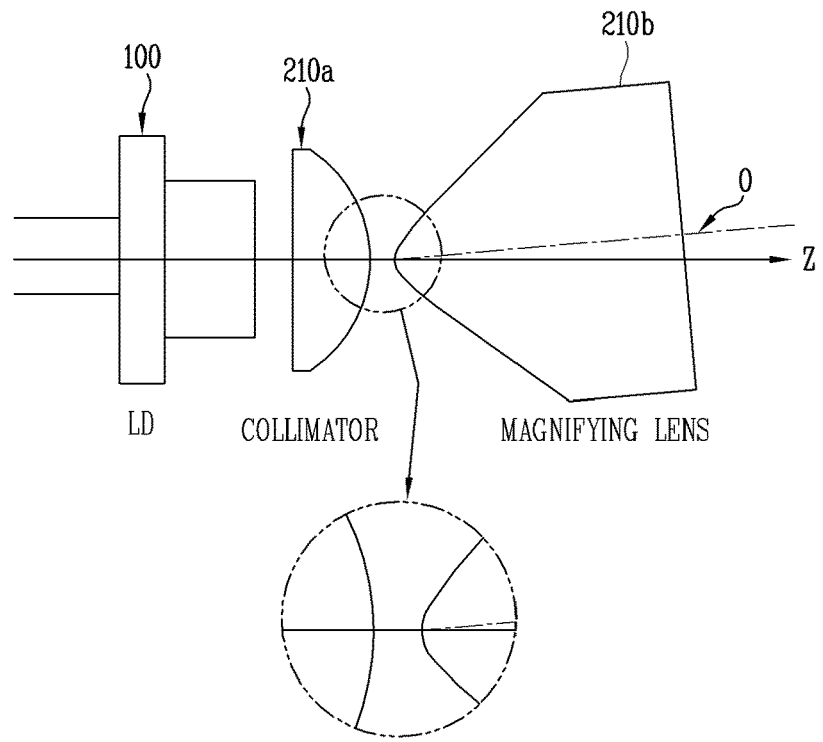

FIGS. 4A and 4B are conceptual views illustrating structural variations of a light emitting lens and a light emitting unit.

Referring to FIG. 4A, a light emitting unit 100 which is configured as a laser diode (LD), a collimator 210a, and a magnifying lens 210b are shown. The collimator 210a and the magnifying lens 210b are part of the light emitting lens unit 210. Each center of the light emitting unit 100 and the collimator 210a forms an optical output axis Z.

However, the optical output axis Z is not aligned with a central axis of the magnifying lens 210b, and the central axis of the magnifying lens 210b is shifted with respect to the optical output axis Z. That is, the optical output axis Z is aligned with a decent axis of the magnifying lens 210b.

A range in which the optical output axis Z and the central axis are shifted from each other corresponds to about 1 mm.

According to this structure, light passing through the collimator 210a are incident on the decent axis of the magnifying lens 210b and is diffused by a shape of the magnifying lens 210b. The diffused light has an asymmetric distribution with respect to the optical output axis Z.

Referring to FIG. 4B, the magnifying lens 210b is disposed in an inclined manner so that the central axis of the magnifying lens 210b forms a specific angle with respect to the optical output axis Z. Accordingly, the distribution of the diffused light has an asymmetrical shape with respect to the optical output axis Z.

An angle between the optical output axis Z and the central axis of the magnifying lens 210b is about 10°.

As the range for diffusing light increases, the shifted range and the angle between the optical output axis Z and the central axis may decrease.

According to these embodiments, the distribution of light diffused through the magnifying lens has the asymmetric shape with respect to the optical output axis that forms the center of the asymmetric optical sensor device. Therefore, an asymmetric light amount can be provided according to a distance. This may allow light to be output to a region to be detected by a different function, thereby detecting an object more clearly.

According to those embodiments of the present invention, a wide area can be detected by forming a wide angle of view, objects located at different distances can be detected by using a single light source unit even without an additional configuration or optical device, and a different amount of light can be obtained depending on a distance and angle, which may allow the use of a single asymmetric optical sensor device even when different regions are detected according to different functions. Also, since no additional configuration or optical device is required, such device can be made compact.

Therefore, the detailed description should not be limitedly interpreted in all the aspects and should be understood to be illustrative. Therefore, all changes and modifications that fall within the metes and bounds of the claims, or equivalents of such metes and bounds are therefore intended to be embraced by the appended claims.

INDUSTRIAL AVAILABILITY

The present invention relates to an optical sensor device, and provides an optical structure capable of detecting objects located at different distances because light is asymmetrically diffused. Therefore, the present invention can be utilized in various related industrial fields.

The invention claimed is:

1. An asymmetric optical sensor device, comprising:
a light emitting unit to emit light toward an external object located between a first end position apart by a first distance and a second end position spaced apart by a second distance from the light emitting unit;
a light receiving unit to receive light reflected by the external object; and
a lens unit to diffuse the light of the light emitting unit to a reception area ranging from the first end position to the second end position from the light emitting unit,
wherein the light emitting unit includes a plurality of light sources, the plurality of light sources sequentially output light and each of the plurality of light sources output light to a different region of the reception area,
wherein the plurality of light sources are controlled to output different amounts of light depending on a distance from each of the plurality of light sources to each region of the reception area and an angle of transmission from each of the plurality of light sources to each region of the reception area, wherein the distance is ranged from the first distance corresponding to the first end position to the second distance and corresponding to the second end position, and
wherein the light output from each of the plurality of light sources is reflected by an object and sequentially reaches the light receiving unit, and
wherein amounts of light received by the light receiving unit at the first end position and the second end position are increased when the plurality of light sources are controlled to output different amounts of light depending on the distance and the angle of the transmission to each region of the reception area.

2. The asymmetric optical sensor device of claim 1, wherein the lens unit includes:
a magnifying lens disposed between the light emitting unit and the external object,
wherein a center axis of the magnifying lens and a center axis of the light emitting unit are parallel to each other.

3. The asymmetric optical sensor device of claim 2, wherein a distance between the center axis of the magnifying lens and the center axis of the light emitting unit is approximately 1 mm.

4. The asymmetric optical sensor device of claim 1, wherein the lens unit includes:
a magnifying lens disposed between the light emitting unit and the external object,
wherein a center axis of the magnifying lens and a center axis of the light emitting unit are not aligned with each other.

5. The asymmetric optical sensor device of claim 4, wherein an angle between the center axis of the magnifying lens and the center axis of the light emitting unit is approximately 10°.

6. An asymmetric optical sensor device comprising:
a light emitting unit to emit light to an external object located between a first end position apart by a first distance and a second end position spaced apart by a second distance from the light emitting unit;

a first lens unit to diffuse the light emitted from the light emitting unit and to direct the diffused light toward a reception area ranging from the first end position to the second end position from the light emitting unit to sense any object in the reception area;

a second lens unit to receive a light reflected from the object in the reception area and to generate a reflected diffused light from the object; and a light detecting unit to receive the reflected diffused light from the second lens unit, wherein a center axis of the first lens unit and a center axis of the light emitting unit are misaligned with respect to each other, or a center axis of the second lens unit and a center axis of the light detecting unit are misaligned with respect to each other, wherein the light emitting unit includes a plurality of light sources, the plurality of light sources sequentially output light and each of the plurality of light sources output light to a different region of the reception area, wherein the plurality of light sources output different amounts of light depending on a distance from each of the plurality of light sources to each region of the reception area and an angle of transmission from each of the plurality of light sources to each region of the reception area, wherein the distance is ranged from the first distance corresponding to the first end position to the second distance and corresponding to the second end position, wherein the light output from each of the plurality of light sources is reflected by an object and sequentially reaches the light detecting unit, and wherein amounts of light received by the light detecting unit at the first end position and the second end position are increased when the plurality of light sources are controlled to output different amounts of light depending on the distance and the angle of the transmission to each region of the reception area.

7. The asymmetric optical sensor device of claim 6, wherein the light detecting unit includes a plurality of light detecting elements for detecting a presence of the object in the reception area.

8. The asymmetric optical sensor device of claim 7, wherein a distance between the center axis of the second lens unit and the center axis of the light detecting unit is approximately 1 mm.

9. The asymmetric optical sensor device of claim 6, wherein a distance between the center axis of the second lens unit and the center axis of the light detecting unit is approximately 1 mm.

10. The asymmetric optical sensor device of claim 6, wherein the first lens unit includes:
a magnifying lens disposed between the light emitting unit and the object,
wherein a center axis of the magnifying lens and the center axis of the light emitting unit are parallel to each other.

11. The asymmetric optical sensor device of claim 10, wherein a distance between the center axis of the magnifying lens and the center axis of the light emitting unit is approximately 1 mm.

12. The asymmetric optical sensor device of claim 6, wherein the first lens unit includes:
a magnifying lens disposed between the light emitting unit and the object,
wherein a center axis of the magnifying lens and the center axis of the light emitting unit form an acute angle.

13. The asymmetric optical sensor device of claim 12, wherein the acute angle between the center axis of the magnifying lens and the center axis of the light emitting unit is approximately 10°.

14. The device of claim 1, wherein the lens unit comprises:
a light emitting lens unit to diffuse the light of the light emitting unit; and
a light receiving lens unit to receive the light being reflected by objects positioned in the reception area,
wherein the light receiving lens unit includes first and second lenses which overlap each other.

15. The device of claim 14, wherein an optical output axis of the light receiving lens unit is disposed to be shifted from a center axis of the light receiving lens unit.

16. The device of claim 1, wherein the light receiving unit generates one image by combining all the light which has reached the light receiving unit with time differences.

17. The device of claim 1, wherein the lens unit comprises:
a light emitting lens unit to diffuse the light of the light emitting unit; and
a light receiving lens unit to receive the light being reflected by objects positioned in the reception area,
wherein the light emitting lens unit includes a collimator and a magnifying lens,
wherein each center of the light emitting unit and the collimator forms an optical output axis, and
wherein a central axis of the magnifying lens is shifted with respect to the optical output axis.

18. The device of claim 17, wherein the optical output axis of the light emitting unit is disposed to form a specific angle with a central axis of the magnifying lens.

* * * * *